United States Patent
Fujita et al.

(10) Patent No.: US 10,472,253 B2
(45) Date of Patent: *Nov. 12, 2019

(54) LIQUID TREATMENT METHOD AND LIQUID TREATMENT APPARATUS

(71) Applicant: Panasonic Intellectual Property Management Co., Ltd., Osaka (JP)

(72) Inventors: Hirofumi Fujita, Osaka (JP); Yasuhiro Hashimoto, Nara (JP); Daisuke Ino, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 32 days.

This patent is subject to a terminal disclaimer.

(21) Appl. No.: 15/682,545

(22) Filed: Aug. 22, 2017

(65) Prior Publication Data
US 2018/0065864 A1    Mar. 8, 2018

(30) Foreign Application Priority Data
Sep. 8, 2016 (JP) .................................. 2016-175391

(51) Int. Cl.
*C02F 1/00* (2006.01)
*C02F 1/32* (2006.01)
(Continued)

(52) U.S. Cl.
CPC ................ *C02F 1/008* (2013.01); *C02F 1/32* (2013.01); *C02F 1/325* (2013.01); *C02F 1/44* (2013.01);
(Continued)

(58) Field of Classification Search
CPC ...... C02F 1/725; C02F 1/32; C02F 1/74; C02F 1/325; C02F 1/008; C02F 1/44;
(Continued)

(56) References Cited

U.S. PATENT DOCUMENTS 5,462,674 A * 10/1995 Butters ............... C02F 1/325
                                                    210/321.69
6,372,095 B1 * 4/2002 Noguchi .............. C02F 1/32
                                                    204/157.48
(Continued)

FOREIGN PATENT DOCUMENTS

JP            2-298393       12/1990
JP         2004-057951        2/2004
(Continued)

*Primary Examiner* — Robert Clemente
*Assistant Examiner* — Akash K Varma
(74) *Attorney, Agent, or Firm* — McDermott Will & Emery LLP

(57) ABSTRACT

The present disclosure provides a liquid treatment method and apparatus according to which poorly treated liquid is prevented from being discharged to the outside thereof. The liquid treatment apparatus of the present disclosure comprises a channel switch, a return channel that establishes communication between the channel switch and an internal space of a first tank, and a discharge channel that establishes communication between the channel switch and the outside of the liquid treatment apparatus. In the circulation state, the liquid mixture is circulated in the liquid treatment apparatus so as to return a liquid to the first tank through the return channel. If a concentration of the photocatalyst particles contained in the first tank falls within a predetermined range, the channel switch is switched from the circulation state to the discharge state to discharge the liquid to the outside of the liquid treatment apparatus.

10 Claims, 7 Drawing Sheets

(51) Int. Cl.
  *C02F 1/44* (2006.01)
  *C02F 1/72* (2006.01)
  *C02F 101/30* (2006.01)
  *C02F 103/34* (2006.01)
  *C02F 101/10* (2006.01)
  *C02F 101/22* (2006.01)

(52) U.S. Cl.
  CPC .............. *C02F 1/444* (2013.01); *C02F 1/725* (2013.01); *C02F 2101/103* (2013.01); *C02F 2101/22* (2013.01); *C02F 2101/30* (2013.01); *C02F 2103/343* (2013.01); *C02F 2301/046* (2013.01); *C02F 2305/10* (2013.01)

(58) Field of Classification Search
  CPC .... C02F 1/444; C02F 1/72; C02F 1/00; C02F 2305/10; C02F 2301/046; C02F 2103/343; C02F 2101/103; C02F 2101/22; C02F 2101/30
  USPC ........................................................ 210/637
  See application file for complete search history.

(56) References Cited

U.S. PATENT DOCUMENTS 6,585,863 B2 * 7/2003 Davydov .................. C02F 1/30
                                                204/157.3
9,586,844 B2    3/2017 Maruo et al.

FOREIGN PATENT DOCUMENTS

JP    2015-116529    6/2015
WO    2013/187028    12/2013
WO    2014/010628    1/2014

* cited by examiner

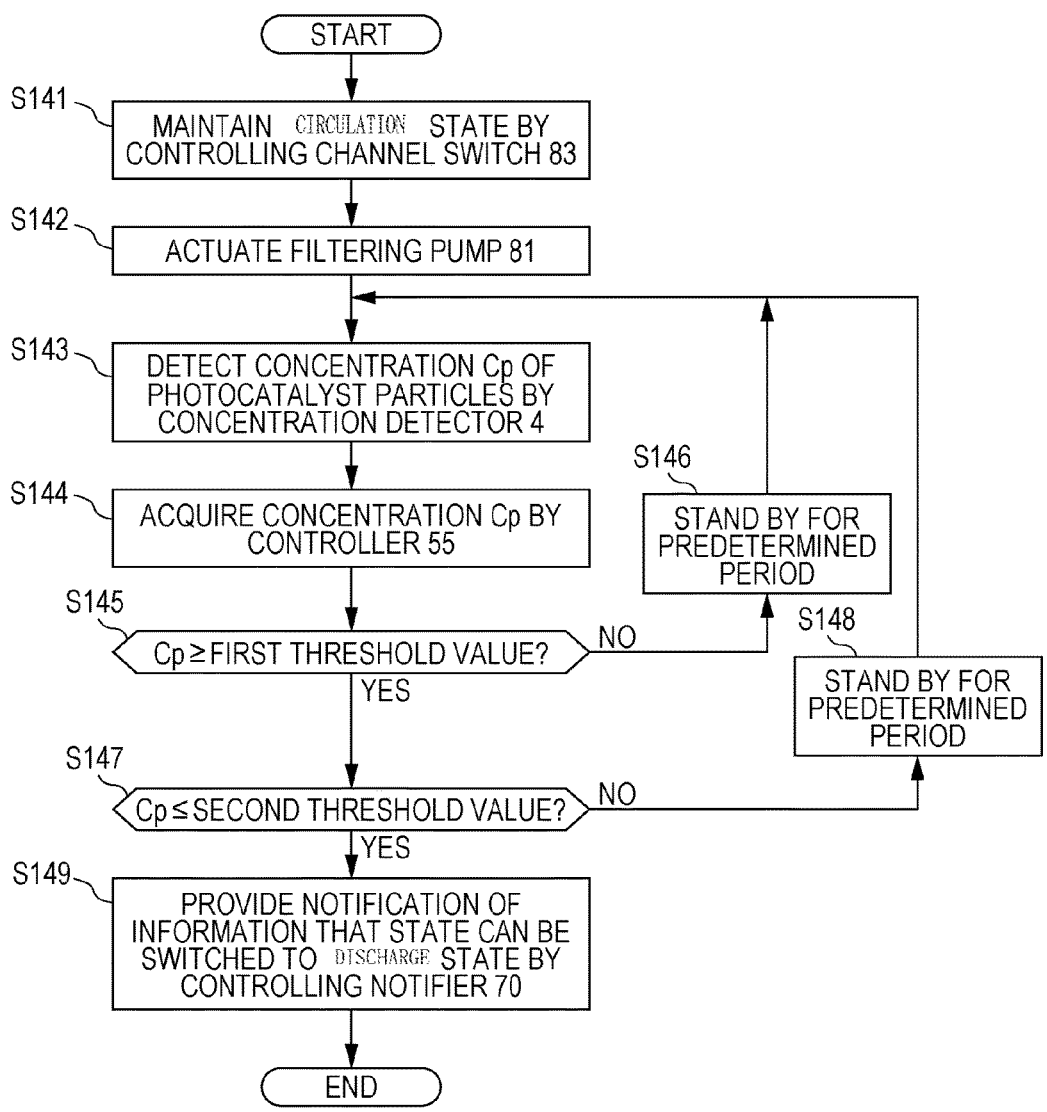

LIQUID TREATMENT METHOD AND LIQUID TREATMENT APPARATUS

BACKGROUND

1. Technical Field

The present disclosure relates to a liquid treatment method and a liquid treatment apparatus.

2. Description of the Related Art

What has been proposed in recent years is a method for purifying water by irradiating catalyst microparticles, such as titanium dioxide microparticles, with ultraviolet light.

For example, PTL 1 discloses a photooxidative treatment apparatus in which a treatment tank and a separation tank are juxtaposed to each other. An ultraviolet emission lamp is inserted into the treatment tank, and the separation tank is provided with an ultrafiltration membrane. Water in which catalyst microparticles are suspended is supplied to the treatment tank. Simultaneously, the ultraviolet emission lamp emits ultraviolet light, so as to allow the catalyst microparticles to purify the water. Next, the water is sent to the separation tank, where the water is caused to pass through the ultrafiltration membrane. Thus, catalyst microparticles contained in the water are collected. Further, rinse water is caused to pass through the ultrafiltration membrane in the reverse direction relative to the water, so as to separate the catalyst microparticles collected at the ultrafiltration membrane. All or part of the rinse water containing the separated catalyst microparticles is returned to the treatment tank as necessary.

CITATION LIST

Patent Literature

PTL 1: Unexamined Japanese Patent Publication No. 2-298393

SUMMARY

Depending on the situation, the photooxidative treatment apparatus disclosed in PTL 1 may possibly discharge poorly purified water to the outside of the apparatus. One non-limiting and exemplary embodiment of the present disclosure provides a liquid treatment method using a liquid treatment apparatus, according to which poorly treated liquid is prevented from being discharged to the outside.

In one general aspect, the techniques disclosed here feature a liquid treatment method using a liquid treatment apparatus. The method includes:

(Ia) providing a liquid treatment apparatus comprising:
 a first tank having an internal space for storing liquid mixture containing photocatalyst particles;
 a light source for emitting ultraviolet light with which the photocatalyst particles are irradiated;
 a second tank comprising a filtration membrane therein and having an internal space divided into a first chamber and a second chamber with the filtration membrane;
 a communication channel that establishes communication between the internal space of the first tank and the second chamber of the second tank;
 a filtering pump for decompressing the first chamber of the second tank;
 a channel switch;
 a return channel that establishes communication between the channel switch and the internal space of the first tank; and
 a discharge channel that establishes communication between the channel switch and an outside of the liquid treatment apparatus,
 wherein
 the liquid mixture is guided from the internal space of the first tank to the second chamber of the second tank through the communication channel;
 the guided liquid mixture is filtered with the filtration membrane to provide a filtrate in the first chamber of the second tank, while the first chamber is decompressed with the filtering pump;
 the filtrate is sucked into the channel switch with the filtering pump; and
 the channel switch is capable of switching between a circulation state in which the filtrate is returned to the first tank through the return channel and a discharge state in which the filtrate is discharged to the outside of the liquid treatment apparatus;

(Ib) circulating the liquid mixture in the liquid treatment apparatus in such a manner that the channel switch is set to be the circulation state so as to return the filtrate to the first tank through the return channel; and (Ic) switching the channel switch from the circulation state to the discharge state to discharge the filtrate to the outside of the liquid treatment apparatus, if a concentration of the photocatalyst particles contained in the first tank falls within a range of not less than a first threshold value and not more than a second threshold value.

The above-described method can prevent poorly treated liquid from being discharged to the outside.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 8 is a flowchart showing other exemplary operation of the liquid treatment apparatus in the concentration stabilizing process.

DETAILED DESCRIPTION

Figure 1:
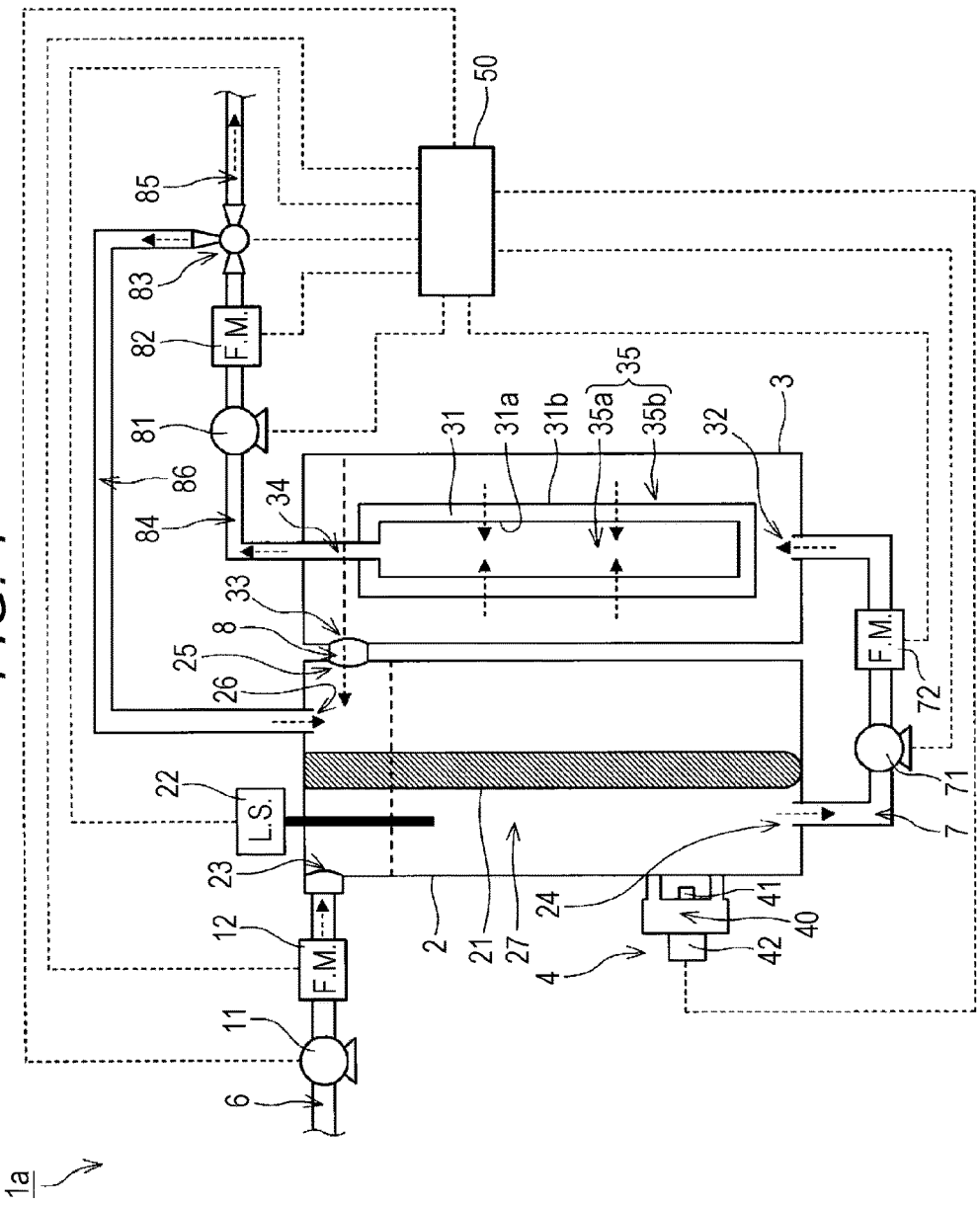
FIG. 1 conceptually shows the configuration of a liquid treatment apparatus according to a first aspect of the present disclosure.

Underlying Knowledge Forming Basis of the Present Disclosure

There may be a plurality of factors in reduced liquid treatment efficiency of a liquid treatment apparatus. For example, photocatalyst particles in liquid mixture being too low in concentration reduces the probability of a substance, which is to react by a photocatalytic reaction, and the photocatalyst particles becoming close to each other to attain the distance required for the reaction to take place. Thus, the reaction efficiency of the photocatalytic reaction reduces, and hence the liquid treatment efficiency reduces. Conversely, the photocatalyst particles in liquid mixture being too high in concentration reduce the transmittance of light in the liquid mixture. This limits the reachable range of ultraviolet light from the light source to a near-distance range from the light source in the liquid mixture, putting the photocatalytic reaction to a transport rate determining step of the substance which is to react by a photocatalytic reaction. This reduces the reaction efficiency of the photocatalytic reaction, and hence the liquid treatment efficiency reduces.

The inventors of the present disclosure have newly found that such a phenomenon, i.e., the concentration of photocatalyst particles largely deviating from the concentration suitable for a reaction, occurs particularly upon actuation of the liquid treatment apparatus. Depending on the state of the photocatalyst particles in the stop state of the liquid treatment apparatus immediately before being actuated, the concentration of the photocatalyst particles may decline or rise upon actuation of the liquid treatment apparatus. For example, when the liquid treatment apparatus is being stopped, the photocatalyst particles precipitate at the bottom of the treatment tank, where the liquid is treated by a photocatalytic reaction. Thus, in this case, until the photocatalyst particles are fully dispersed by flow of liquid caused by the liquid treatment apparatus being actuated, the concentration of the photocatalyst particles may be low. During filtering, the photocatalyst particles deposit on the surface of the filtration membrane as a cake. On the other hand, when the liquid treatment apparatus is being stopped, the cake having been deposited on the surface of the filtration membrane is diffused in the liquid mixture. Accordingly, after actuation of the liquid treatment apparatus and until the photocatalyst particles of a predetermined amount are deposited as a cake at the surface of the filtration membrane by filtering, the concentration of the photocatalyst particles in the liquid mixture may be high. When the liquid treatment apparatus is normally driven with such photocatalyst particles being high or low in concentration, to discharge the filtrate to the outside of the liquid treatment apparatus, the discharged filtrate may be poorly treated. Accordingly, the inventors of the present disclosure have conducted an extensive study on the technology of preventing poorly treated liquid from being discharged to the outside of the liquid treatment apparatus, and devised the liquid treatment method and the liquid treatment apparatus of the present disclosure. Note that, PTL 1 does not disclose or suggest about the necessity of preventing poorly purified water from being discharged to the outside of the photooxidative treatment apparatus attributed to the unstable concentration of the catalyst microparticles at the actuation of the photooxidative treatment apparatus.

First Exemplary Embodiment

As shown in FIG. 1, liquid treatment apparatus 1a includes first tank 2, light source 21, filtration membrane 31, second tank 3, filtering pump 81, communication channel 7, concentration detector 4, discharge channel 85, return channel 86, channel switch 83, and controller 50. First tank 2 has internal space 27 storing liquid mixture containing photocatalyst particles. Light source 21 irradiates the photocatalyst particles with ultraviolet light. Second tank 3 has internal space 35. In internal space 35, a filtration membrane 31 is disposed, and internal space 35 includes first chamber 35a and second chamber 35b. First chamber 35a faces output-side membrane surface 31a of filtration membrane 31. Second chamber 35b faces input-side membrane surface 31b of filtration membrane 31. Filtering pump 81 decompresses first chamber 35a. Communication channel 7 establishes communication between internal space 27 and second chamber 35b of first tank 2. Concentration detector 4 detects the concentration of the photocatalyst particles in first tank 2. Discharge channel 85 extends to the outside of liquid treatment apparatus 1a. Return channel 86 is connected to first tank 2. Channel switch 83 switches between the circulation state and the discharge state. The circulation state refers to the state where first chamber 35a communicates with return channel 86. In the circulation state, first chamber 35a does not communicate with discharge channel 85. The discharge state refers to the state where first chamber 35a communicates with discharge channel 85. In the discharge state, first chamber 35a does not communicate with return channel 86. Controller 50 controls channel switch 83.

With liquid treatment apparatus 1a, the following steps are executed.

(Ib) circulating the liquid mixture in the liquid treatment apparatus 1a in such a manner that the channel switch 83 is set to be the circulation state so as to return the filtrate to first tank 2 through the return channel 86; and (Ic) switching the channel switch 83 from the circulation state to the discharge state to discharge the filtrate to the outside of the liquid treatment apparatus 1a, if a concentration of the photocatalyst particles contained in the first tank falls within a range of not less than a first threshold value and not more than a second threshold value.

As described above, in the circulation state, when the concentration of the photocatalyst particles detected with concentration detector 4 falls within the range from the first threshold value to the second threshold value inclusive, controller 50 causes channel switch 83 to switch from the circulation state to the discharge state.

As shown in FIG. 1, controller 50 is connected in a wireless or wired manner to concentration detector 4 so as to be capable of acquiring information representing the concentration of the photocatalyst particles detected with concentration detector 4. Further, controller 50 outputs control signals for controlling channel switch 83, and is connected in a wireless or wired manner to channel switch 83 so that channel switch 83 can receive the control signals.

The first threshold value and the second threshold value are representatively determined so that the liquid treatment efficiency exhibited when the photocatalyst particles is irradiated with ultraviolet light from light source 21 falls within a proper range. For example, the first threshold value is determined to be about half (0.5 times) as great as the concentration with which the photocatalytic reaction efficiency is maximized, and the second threshold value is set to be about twice as great as the concentration with which the photocatalytic reaction efficiency is maximized.

According to the above-described method, when the concentration of the photocatalyst particles detected with the concentration detector 4 falls within a range from the first threshold value to the second threshold value inclusive, controller 50 controls channel switch 83 to switch from the circulation state to the discharge state. Accordingly, when the concentration of the photocatalyst particles in first tank 2 falls within a range with which the proper liquid treatment efficiency is exhibited, the filtrate can be discharged to the outside of liquid treatment apparatus 1a. This prevents poorly treated liquid from being discharged to the outside of liquid treatment apparatus 1a.

As shown in FIG. 1, first tank 2 has, for example, first inlet 23, first outlet 24, second inlet 25, and third inlet 26. A polluted liquid (e.g., polluted water) is supplied through first inlet 23 to first tank 2. The polluted liquid may be referred to as liquid to be treated. Second tank 3 has, for example, supply port 32, first discharge port 33, and second discharge port 34. To first inlet 23, introduction channel 6 is connected. At introduction channel 6, pump 11 and flowmeter 12 are disposed. First outlet 24 and supply port 32 are connected to each other with communication channel 7. Supply port 32 is disposed at second chamber 35b of second tank 3. For example, at communication channel 7, pump 71 and flowmeter 72 are disposed. Between first tank 2 and second tank 3, liquid mixture return channel 8 that establishes communication between the internal space of first tank 2 and internal space 35 of second tank 3 is formed. Slurry return channel 8 is a channel for allowing the liquid mixture in second chamber 35b to return to first tank 2 by an overflow. Second inlet 25 and first discharge port 33 are connected to each other with liquid mixture return channel 8. Second discharge port 34 and channel switch 83 are connected to each other with extraction channel 84. Second discharge port 34 connects between first chamber 35a and extraction channel 84. Filtering pump 81 is, for example, disposed at extraction channel 84. Further, at extraction channel 84, flowmeter 82 is disposed. Third inlet 26 is connected to channel switch 83 with return channel 86. Further, discharge channel 85 extends from channel switch 83 toward the outside of liquid treatment apparatus 1a.

For example, pump 11 and pump 71 are connected in a wireless or wired manner to controller 50 so as to be capable of receiving control signals from controller 50. Pump 11, pump 71, and pump 81 may be referred to as supply pump 11, circulating pump 71, and filtration pump 81, respectively.

First tank 2 stores slurry that contains photocatalyst particles. For example, with actuating pump 11, polluted liquid is supplied to first tank 2 through introduction channel 6 and first inlet 23. In this way, the slurry containing photocatalyst particles is mixed with the polluted liquid to prepare the liquid mixture containing photocatalyst particles and the polluted liquid. Not specifically limited but pump 11 is exemplarily a tube pump. The tube pump is a pump in which an elastic tube is squeezed with a roller to send out liquid.

The polluted liquid is liquid that contains a substance that is chemically changed due to a photocatalytic action of the photocatalyst particles, or life forms that are killed due to such a photocatalytic action of the photocatalyst particles. The polluted liquid is, for example, water that contains any substance or life forms being harmful to human, e.g., metal such as trivalent arsenic or hexavalent chromium, an organic compound contained in pharmaceuticals or agricultural chemicals, or microbes. The polluted liquid may be liquid that contains a material for generating a desired product by a photocatalytic action of the photocatalyst particles. The photocatalyst particles are, for example, composite particles in which titanium dioxide particles are attached to carrier particles of titanium dioxide, zeolite. A photocatalytic reaction that takes place by the photocatalyst particles being irradiated with ultraviolet light treats the substance or life forms contained in the polluted liquid. In this manner, by the photocatalyst particles being irradiated with ultraviolet light, the polluted liquid is treated and the treated liquid is generated. The treated liquid is discharged from first tank 2 through first outlet 24.

For example, in the case where the photocatalyst particles contain titanium dioxide, when titanium dioxide is irradiated with ultraviolet light, excited electrons and positive holes are generated in the titanium dioxide. Further, a reaction between the positive holes and water molecules generates hydroxyl radicals (i.e., reactive oxygen species) which are highly oxidative. The generated excited electrons and reactive oxygen species cause an oxidation-reduction reaction of a substance contained in the polluted liquid. This decomposes any organic compound contained in pharmaceuticals or agricultural chemicals, and destroys microbes. This can also change the state of poisonous metal to the state where removal is facilitated. For example, the generated reactive oxygen species turn trivalent arsenic into pentavalent arsenic, so as to be easily absorbed. Alternatively, the generated excited electrons turn hexavalent chromium into trivalent chromium, so as to be precipitated. In this manner, the photocatalyst particles can conduct a predetermined liquid treatment on the polluted liquid by a photocatalytic reaction which takes place under irradiation with light. Note that, after the poisonous metal is turned to the state where removal thereof is facilitated (after the liquid treatment), the poisonous metal is removed by absorption, precipitation and the like in other operations.

As shown in FIG. 1, for example, liquid level sensor 22 is attached to first tank 2. Liquid level sensor 22 detects the liquid level of first tank 2. For example, controller 50 is connected to liquid level sensor 22 so as to be capable of acquiring the information representing the liquid level detected by liquid level sensor 22.

As shown in FIG. 1, light source 21 is, for example, disposed in the internal space of first tank 2. For example, the light emission surface of light source 21 extends as a cylindrical surface, along the axial direction of first tank 2. Further, light source 21 representatively emits ultraviolet light. The wavelength range of ultraviolet light emitted by light source 21 is, for example, from 200 nm to 400 nm inclusive. The ultraviolet light emitted with light source 21 may be any of monochromatic light and continuous light. Light source 21 is, for example, a low pressure mercury lamp, a medium pressure mercury lamp, a high pressure mercury lamp, an excimer lamp, a xenon lamp, a sunbeam, a black light, or a Light-emitting diode (LED). In some cases, light source 21 may be disposed outside first tank 2. In such cases, first tank 2 is made of a material capable of transmitting ultraviolet light, and the photocatalyst particles are irradiated with ultraviolet light that is emitted by light source 21 and transmitting through the wall of first tank 2.

For example, by actuating pump 71, the treated liquid discharged from first tank 2 is guided to and stored in second chamber 35b of second tank 3 through communication channel 7 and supply port 32. Not specifically limited but pump 71 is exemplarily a tube pump. Filtration membrane 31 is, for example, a hollow fiber membrane or a flat membrane, and has a plurality of holes which are smaller in size than the photocatalyst particles and greater than solvent molecules and solute molecules in the treated liquid. Second discharge port 34 is positioned between first chamber 35a and extraction channel 84. By actuating filtering pump 81, first chamber 35a is decompressed. Thus, the liquid mixture containing the treated liquid stored in second chamber 35b is filtered with filtration membrane 31, to obtain the filtrate. That is, by filtration of the treated liquid with filtration membrane 31, the photocatalyst particles are kept at input-side membrane surface 31b of filtration membrane 31, so that a filtrate is obtained at first chamber 35a, which filtrate is the filtrate having passed through filtration membrane 31 and not containing the photocatalyst particles. Not specifically limited but filtering pump 81 is exemplarily a tube pump. By decompressing first chamber 35a with filtering pump 81, the filtrate is guided to extraction channel 84 through second discharge port 34, Since the photocatalyst particles are kept in second chamber 35b of second tank 3 with filtration membrane 31, second chamber 35b stores the liquid mixture containing the photocatalyst particles of an increased concentration. The liquid level of second chamber 35b of second tank 3 is adjusted to become higher than the liquid level of first tank 2. Accordingly, the high-concentration liquid mixture stored in second chamber 35b is sent, by overflow, to first tank 2 through first discharge port 33, liquid mixture return channel 8, and second inlet 25.

In this manner, in second tank 3, by filtering the liquid mixture containing the treated liquid using filtration membrane 31, the filtrate is obtained. Specifically, while filtration membrane 31 is immersed in the liquid mixture containing the treated liquid stored in second chamber 35b in second tank 3, first chamber 35a surrounded by the second chamber 35b is decompressed with filtering pump 81. Thus, the filtrate not containing the photocatalyst particles is extracted from first chamber 35a, because the particle size of the photocatalyst particles dispersed in the liquid mixture containing the treated liquid is greater than the diameter of each pore of filtration membrane 31 and, therefore, the photocatalyst particles cannot pass through filtration membrane 31.

For example, extraction channel 84, discharge channel 85, and return channel 86 are connected to channel switch 83. For example, channel switch 83 can selectively establish communication between extraction channel 84 and one of discharge channel 85 and return channel 86. For example, channel switch 83 realizes the discharge state by establishing communication between extraction channel 84 and discharge channel 85, and blocking communication between extraction channel 84 and return channel 86. Further, channel switch 83 realizes the circulation state by establishing communication between extraction channel 84 and return channel 86, and blocking communication between extraction channel 84 and discharge channel 85. Not specifically limited but channel switch 83 is exemplarily a three-way valve.

As shown in FIG. 1, for example, concentration detector 4 is attached to first tank 2. Concentration detector 4 detects, for example, in first tank 2, the concentration of the photocatalyst particles in the liquid mixture or liquid at a level higher than the lower end of the light emission surface of light source 21.

Figure 2:
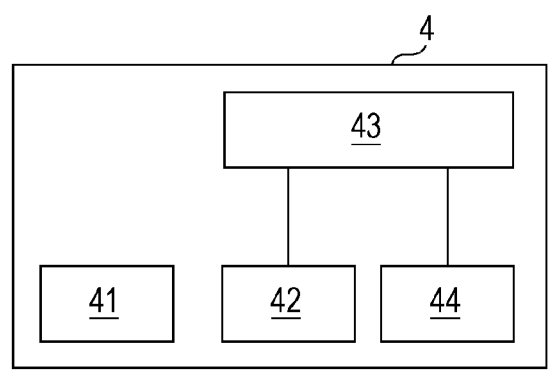
FIG. 2 is a block diagram showing an exemplary configuration of a concentration detector.

As shown in FIGS. 1 and 2, for example, concentration detector 4 includes detection-purpose channel 40, detection-purpose light source 41, illuminometer 42, calculator 43, and output unit 44. Detection-purpose channel 40 is continuous to the internal space of first tank 2, and part of the liquid mixture or liquid in first tank 2 is guided to detection-purpose channel 40. Detection-purpose light source 41 and illuminometer 42 face each other so as to interpose detection-purpose channel 40 therebetween. In detecting concentration, detection-purpose light source 41 emits light toward illuminometer 42 while part of liquid mixture or liquid is guided to detection-purpose channel 40. In this case, illuminometer 42 receives transmitted light that has been emitted with detection-purpose light source 41 and passed through the liquid mixture or liquid in detection-purpose channel 44, and measures the intensity of the transmitted light. The information representing the intensity of the transmitted light measured with illuminometer 42 is sent to calculator 43, and calculator 43 determines concentration Cp of the photocatalyst particles in first tank 2 based on the information. Concentration Cp of the photocatalyst particles in first tank 2 determined with calculator 43 is output to controller 50 via output unit 44.

Calculator 43 refers to, for example, a table or a relational expression showing the relationship between the absorbance and the concentration of the photocatalyst particles, to determine the concentration of the photocatalyst particles in first tank 2. In this case, for example, calculator 43 calculates the absorbance using the information representing the intensity of the transmitted light and the information on the intensity of the light emitted with detection-purpose light source 41. In some cases, calculator 43 may refer to a table or a relational expression showing the relationship between the intensity of the transmitted light and the concentration of the photocatalyst particles, to determine concentration Cp of the photocatalyst particles in first tank 2. In determining the concentration of the photocatalyst particles in calculator 43, the Lambert-Beer law expressed by the following (Equation 1) can be used: $I = I_0 \cdot \exp(-\varepsilon c l)$ (Equation 1), where I is intensity of light after transmitted through a medium, $I_0$ is intensity of light before becoming incident on the medium, $\varepsilon$ is the molar absorbance coefficient, c is the molarity of the medium, and l is the length of the medium. By measuring intensity I of light having transmitted through the medium, the concentration of the photocatalyst particles in first tank 2 is determined.

Concentration detector 4 may detect the concentration of the photocatalyst particles in first tank 2 by, for example, measuring the viscosity or specific gravity of the liquid mixture at a particular portion in first tank 2. Further, concentration detector 4 may emit ultrasound or X-rays which travels through the liquid mixture to detect the concentration of the photocatalyst particles in first tank 2.

Figure 3:
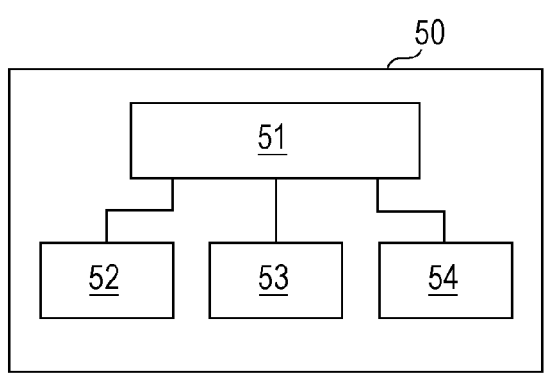
FIG. 3 is a block diagram showing an exemplary configuration of a controller.

As shown in FIG. 3, controller 50 has calculator 51, input unit 52, storage 53, and output unit 54. Controller 50 may be attached to first tank 2 or second tank 3, or may be disposed near first tank 2 or second tank 3. Alternatively, controller 50 may be disposed at a remote location far away from first tank 2 and second tank 3.

Controller 50 acquires, via input unit 52, concentration Cp of the photocatalyst particles in first tank 2 output from output unit 44 of concentration detector 4. Concentration Cp is sent to calculator 51. Further, calculator 51 acquires a first threshold value and a second threshold value stored in storage 53. Thereafter, calculator 51 determines whether or not concentration Cp falls within a range from the first threshold value to the second threshold value inclusive. Based on the result of the determination, calculator 51 generates a proper control signal. The proper control signal is output to channel switch 83 via output unit 54.

Figure 4:
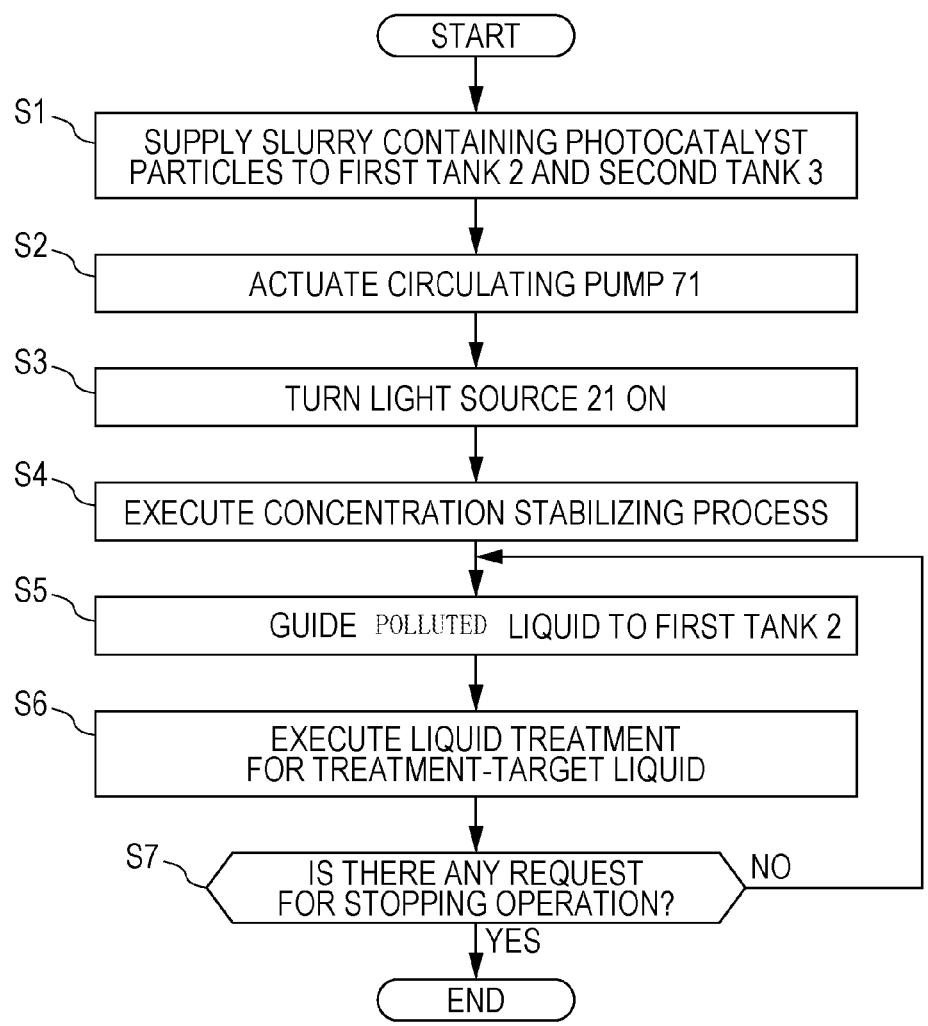
FIG. 4 is a flowchart showing an exemplary operation of the liquid treatment apparatus of the present disclosure.

Next, a description will be given of an exemplary operation of liquid treatment apparatus 1a upon actuation. As shown in FIG. 4, in step S1, liquid mixture containing photocatalyst particles is supplied to first tank 2 and second tank 3. Note that, step S1 can be omitted, when the liquid mixture containing the photocatalyst particles has been already supplied to first tank 2 and second tank 3 of liquid treatment apparatus 1a. Next, in step S2, circulating pump 71 is actuated. Thus, flow of the liquid mixture or liquid is generated inside first tank 2. In this way, precipitated photocatalyst particles are dispersed in first tank 2. Next, in step S3, the switch of light source 21 is turned ON, and liquid treatment apparatus 1a stands by so as to cause an oxidation-reduction reaction by the photocatalyst particles to immediately take place once the polluted liquid is guided into first tank 2. Next, in step S4, a concentration stabilizing process is executed.

Figure 5:
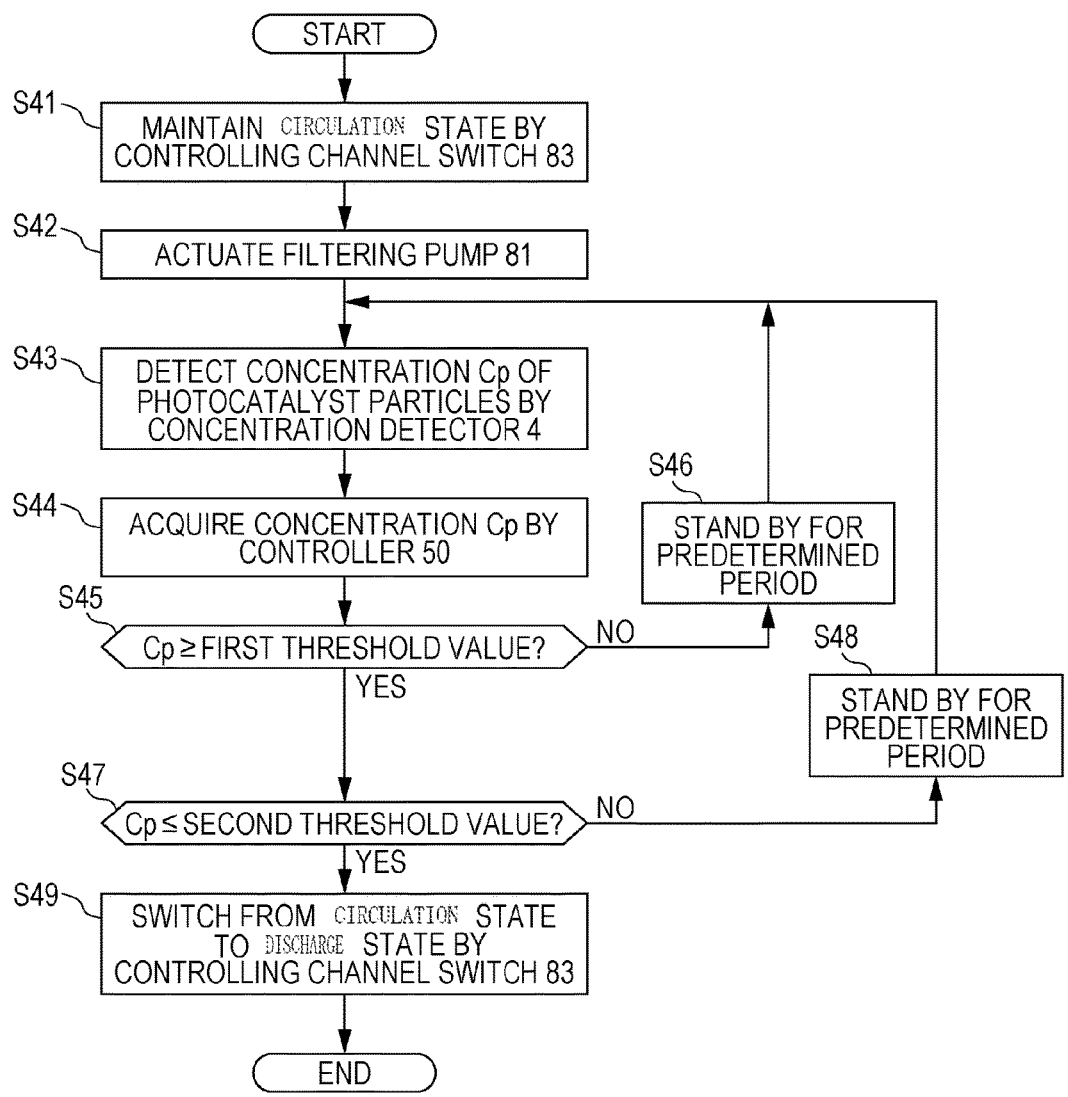
FIG. 5 is a flowchart showing an exemplary operation of the liquid treatment apparatus in a concentration stabilizing process.

As shown in FIG. 5, the concentration stabilizing process includes, for example, the following steps S41 to S49. Firstly, in step S41, channel switch 83 is controlled with controller 50, to maintain the circulation state. In step S41, as necessary, channel switch 83 is controlled by controller 50, to switch from the discharge state to the circulation state. Next, in step S42, filtering pump 81 is actuated. Thus, filtering pump 81 decompresses first chamber 35a, whereby filtrate in first chamber 35a is sent to first tank 2 through extraction channel 84 and return channel 86. In this case, liquid is not supplied to the outside of liquid treatment apparatus 1b, and first tank 2 is not supplied with liquid. Therefore, the amount of liquid mixture in first tank 2 and second tank 3 is constant. Due to the flow generated by the operation of circulating pump 71 actuated in step S2, the photocatalyst particles precipitated in the internal space of first tank 2 and the internal space of second tank 3 are dispersed, and the concentration of the photocatalyst particles in first tank 2 rises. Additionally, by the operation of filtering pump 81 actuated in step S42, the photocatalyst particles in liquid mixture deposit on input-side membrane surface 31b of filtration membrane 31 as a cake layer. Thus, the concentration of the photocatalyst particles in first tank 2 reduces. These phenomena will be saturated after a lapse of a predetermined time and, therefore, the concentration of the photocatalyst particles in first tank 2 gradually stabilizes. During this period, in step S43, concentration detector 4 detects concentration Cp of the photocatalyst particles.

In step S44, controller 50 acquires concentration Cp of the photocatalyst particles from concentration detector 4. In step S45, controller 50 determines whether or not concentration Cp of the photocatalyst particles is equal to or greater than first threshold value. When the result of the determination in step S45 is negative, controller 50 proceeds to step S46 and stands by for a predetermined period, and returns to step S43. In this case, as necessary, controller 50 transmits a control signal to channel switch 83, to maintain the circulation state. When the result of the determination in step S45 is positive, controller 50 proceeds to step S47, and determines whether or not concentration Cp of the photocatalyst particles is equal to or smaller than the second threshold value. When the result of the determination in step S47 is negative, controller 50 proceeds to step S48 and stands by for a predetermined period, and returns to step S43. In this case, as necessary, controller 50 transmits a control signal to channel switch 83, to maintain the circulation state. When the result of the determination in step S47 is positive, controller 50 proceeds to step S49, where controller 50 transmits a control signal to channel switch 83, to switch from the circulation state to the discharge state. Thus, the concentration stabilizing process ends, and controller 50 proceeds to step 35 as shown in FIG. 4.

Figure 6:
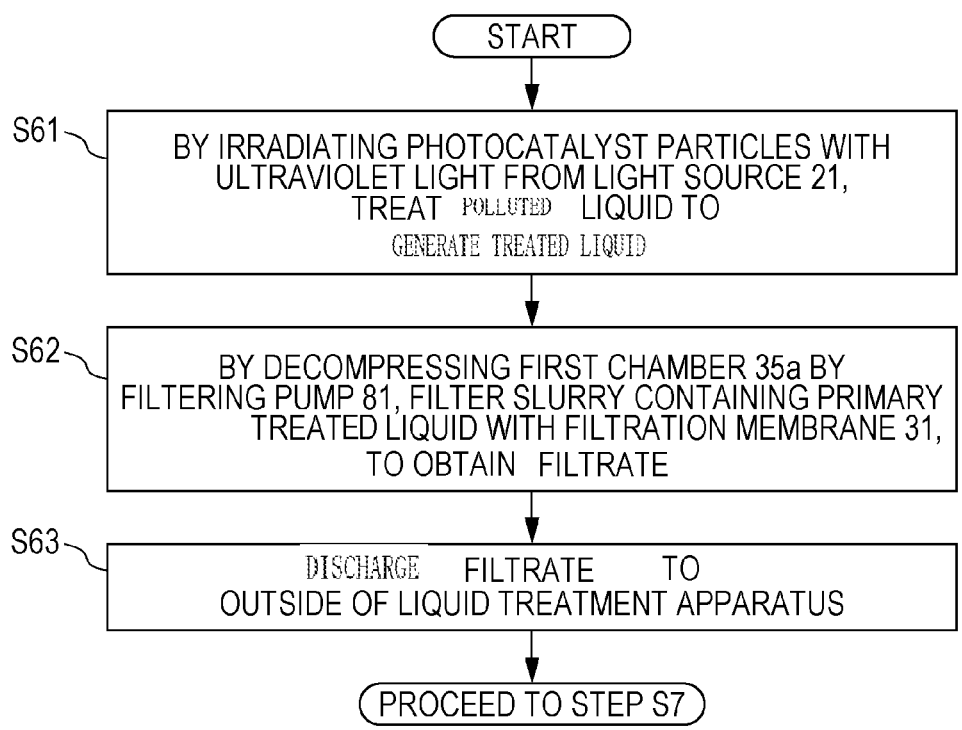
FIG. 6 is a flowchart showing an exemplary operation of the liquid treatment apparatus in a discharge state.

In step S5, the polluted liquid is guided to first tank 2. For example, controller 50 transmits a control signal to pump 11 to actuate pump 11. Further, in step S5, the polluted liquid may be guided to first tank 2 by the operator actuating pump 11. Next, in step S6, a liquid treatment for the polluted liquid is executed. For example, the liquid treatment for the polluted liquid includes steps S61 to S63 shown in FIG. 6.

In step S61, by irradiating the photocatalyst particles with ultraviolet light from light source 21, the polluted liquid is treated to generate the treated liquid. Next, in step S62, by decompressing first chamber 35a with filtering pump 81, liquid mixture containing the treated liquid is filtered with filtration membrane 31, to obtain the filtrate. Next, in step S63, the filtrate is extracted from first chamber 35a, and discharged to the outside of liquid treatment apparatus 1a through discharge channel 85. Thereafter, control proceeds to step S7. Note that, the high-concentration liquid mixture stored in second chamber 35b is sent to first tank 2 through liquid mixture returning path 8.

In step S7, whether or not there exists a request for stopping operations of liquid treatment apparatus 1a is determined. When the determination result in step 37 is negative, the operations of steps S5 and S6 continue. When the determination result in step S7 is positive, an operation for stopping operations of liquid treatment apparatus 1a is performed, and the series of operations end.

Part of the units or devices in liquid treatment apparatus 1a may be configured by a semiconductor device, or one or more electronic circuits including a semiconductor integrated circuit (IC) or a large scale integration (LSI). Further, all or part of the functional blocks in concentration detector 4 and controller 50 shown in FIGS. 2 and 3 may be configured by a semiconductor device, or at least one electronic circuit including an IC or an LSI. In this case, the LSI or the IC may be integrated on one chip, or may be configured by a combination of a plurality of chips. For example, the functional blocks other than the storage may be integrated on one chip. Here, while the terms LSI and IC are used for the sake of convenience, the LSI and the IC may be referred to as a system LSI, a very large scale integration (VLSI), or an ultra large scale integration (ULSI) depending on the scale of integration. A Field Programmable Gate Array (FPGA) programmed after manufacture of the LSI, or a reconfigurable logic device with which the connections inside the LSI can be reconfigurable or circuits partitions inside the LSI can be set up can also be used. Further, all or part of the functions and operations of units, apparatuses, or part of apparatuses in liquid treatment apparatus 1a can be executed by software processing. In this case, the software is recorded on at least one non-transitory recording medium such as a ROM, an optical disc, and a hard disk drive. When the software is executed by a processing apparatus (processor), the software causes the processing apparatus (processor) and peripheral devices to execute specific functions defined by the software. The systems or the apparatuses in liquid treatment apparatus 1a may include at least one non-transitory recording medium recording the software, a processing apparatus (processor), and any required hardware device such as an interface.

Second Exemplary Embodiment

Next, a description will be given of liquid treatment apparatus 1b and a liquid treatment method using liquid treatment apparatus 1b according to a second exemplary embodiment. Unless otherwise specified, the second exemplary embodiment is configured similarly to the first exemplary embodiment. The constituents of the second exemplary embodiment identical or corresponding to those of the first exemplary embodiment are denoted by identical reference characters, and detailed description thereof will not be repeated. The description of the first exemplary embodiment holds true for the second exemplary embodiment unless it is technically inconsistent.

Figure 7:
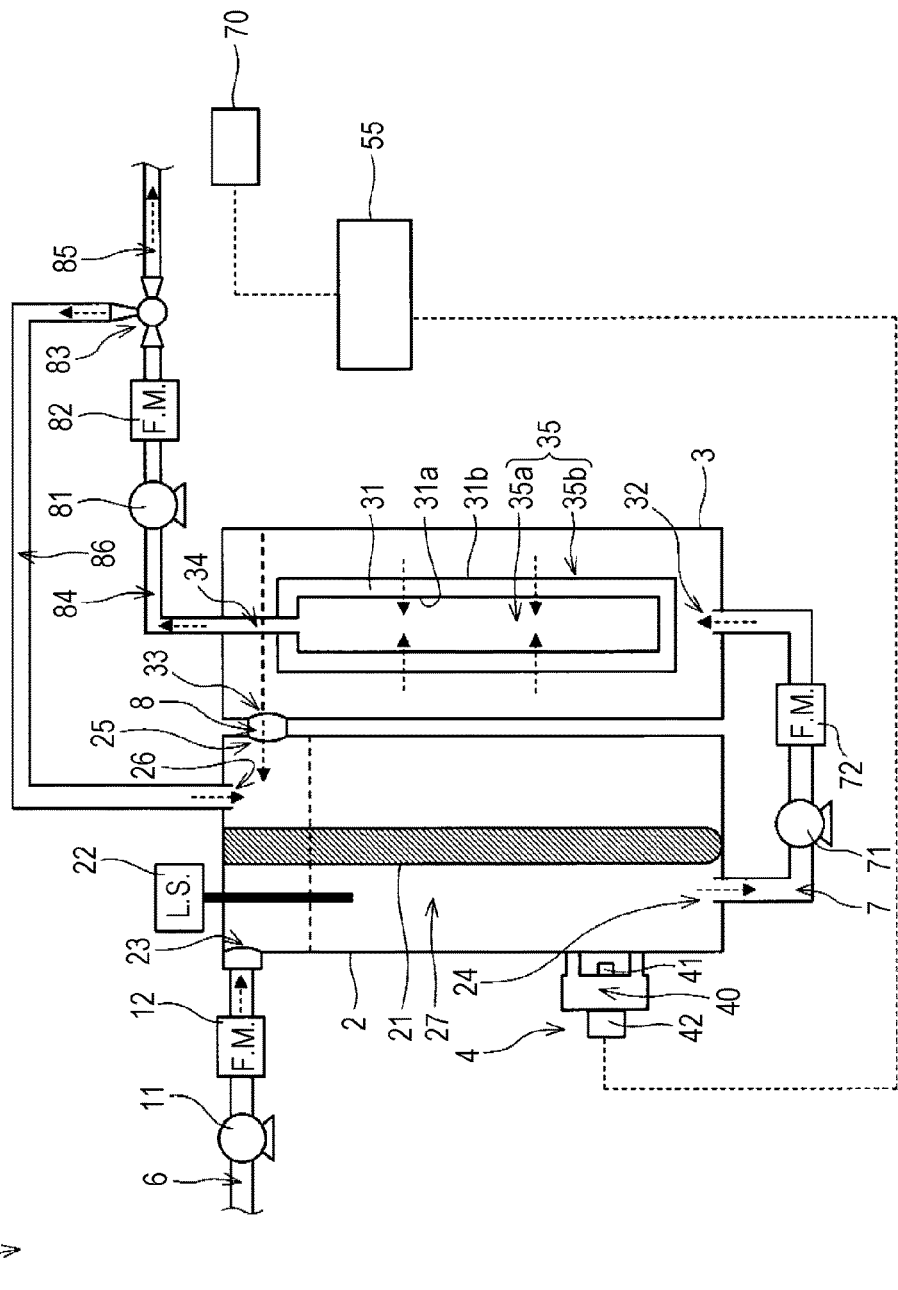
FIG. 7 conceptually shows the configuration of a liquid treatment apparatus according to a second aspect of the present disclosure.

As shown in FIG. 7, liquid treatment apparatus 1b is configured similarly to liquid treatment apparatus 1a except for including notifier 70, and controller 55 in place of controller 50. Similarly to controller 50, controller 55 includes a calculator, an input unit, a storage, and an output unit. Notifier 70 provides a notification of predetermined information. Controller 55 controls notifier 70. Notifier 70 is connected to controller 55 in a wireless or wired manner so as to be capable of acquiring control signals from controller 55. Further, controller 55 is connected to concentration detector 4 in a wireless or wired manner so as to be capable of acquiring, from concentration detector 4, the concentration of the photocatalyst particles in first tank 2 detected with concentration detector 4.

With liquid treatment apparatus 1b, the following method is executed, the method includes:

(IIa) providing the liquid treatment apparatus 1a;

(IIb) circulating the liquid mixture in the liquid treatment apparatus 1a in such a manner that the channel switch 83 is set to be the circulation state so as to return the filtrate to first tank through the return channel; and (IIc) providing a notification of information showing that the circulation state can be switched to the discharge state, if a concentration of the photocatalyst particles contained in the first tank 2 falls within a range of not less than a first threshold value and not more than a second threshold value.

By being notified of information by notifier 70 showing that the circulation state can be switched to the discharge state, the operator can switch from the circulation state to the discharge state by operating channel switch 83. Accordingly, when the concentration of the photocatalyst particles in first tank 2 falls within a range suitable for a photocatalytic reaction, the filtrate being the filtrate can be discharged to the outside of liquid treatment apparatus 1b. This prevents liquid which has been insufficiently treated liquid from being discharged to the outside.

Notifier 70 is not specifically limited, so long as it is capable of providing a notification of predetermined information by appealing to the senses of human. For example, notifier 70 may be a speaker or a beeper capable of providing a notification of predetermined information by sound, a display apparatus capable of displaying predetermined information such as a liquid crystal display, or an indicator lamp capable of providing a notification of predetermined information by lighting up or blinking.

A description will be given of an exemplary operation of liquid treatment apparatus 1b. As shown in FIG. 8, liquid treatment apparatus 1b operates similarly to liquid treatment apparatus 1a, except that the concentration stabilizing process executed in step S4 with liquid treatment apparatus 1b includes steps S141 to S149. Note that, step S141, step S142, step S143, step S144, step S145, step S146, step S147, and step S148 are respectively performed similarly to step S41, step S42, step S43, step S44, step S45, step S46, step S47, and step S48. When the result of the determination in step S147 is positive, in step S149, controller 55 causes notifier 70 to provide a notification of information showing that the circulation state can be switched to the discharge state. Note that, when the result of the determination in step S145 or step S147 is negative, controller 55 may cause notifier 70 to provide a notification of information showing that the circulation state should be maintained. Further, when the result of the determination in step S149 is positive, controller 55 may cause notifier 70 to provide a notification of information showing that the polluted liquid can be guided to first tank 2.

The liquid treatment apparatus and the liquid treatment method of the present disclosure are useful, for example, as a water treatment apparatus and a water treatment method, each of which exhibits high reaction efficiency and is capable of performing a long-period continuous operation.

REFERENCE SIGNS LIST 1a, 1b: liquid treatment apparatus
2: first tank
3: second tank
4: concentration detector
7: communication channel
21: light source
31: filtration membrane
31a: output-side membrane surface
31b: input-side membrane surface
35: internal space
35a: first chamber
35b: second chamber
50: controller
55: controller
70: notifier
81: filtering pump
83: channel switch
85: discharge channel
86: return channel

What is claimed is:

1. A liquid treatment method using a liquid treatment apparatus, the method comprising:

(Ia) providing the liquid treatment apparatus comprising:
a first tank having an internal space for storing liquid mixture containing photocatalyst particles;
a light source for emitting ultraviolet light with which the photocatalyst particles contained in the liquid mixture stored in the internal space of the first tank are irradiated;
a second tank comprising a filtration membrane therein and having an internal space divided into a first chamber and a second chamber by the filtration membrane; the first chamber being surrounded by the second chamber;
a communication channel that establishes communication between the internal space of the first tank and the second chamber of the second tank;
a controller;
a filtering pump for decompressing the first chamber of the second tank;
a channel switch;
an extraction channel that establishes communication between the first chamber of the second tank and the channel switch through the filtering pump;
a return channel that establishes communication between the channel switch and the internal space of the first tank; and
a discharge channel that establishes communication between the channel switch and an outside of the liquid treatment apparatus, wherein
  the liquid mixture is guided from the internal space of the first tank to the second chamber of the second tank through the communication channel;
  the guided liquid mixture is passed through the filtration membrane to provide a filtrate in the first chamber of the second tank, the filtrate being generated by passing the guided liquid mixture through the filtration membrane, while the first chamber is decompressed with the filtering pump;
  the filtrate generated by passing the guided liquid mixture through the filtration membrane is sucked into the channel switch through the extraction channel with the filtering pump; and
  the channel switch switching by the controller between a circulation state in which the filtrate generated by passing the guided liquid mixture through the filtration membrane is returned to the first tank through the return channel and a discharge state in which the filtrate generated by passing the guided liquid mixture through the filtration membrane is discharged to the outside of the liquid treatment apparatus;
(Ib) circulating the liquid mixture in the liquid treatment apparatus in such a manner that the channel switch is set to be the circulation state so as to return the filtrate generated by passing the guided liquid mixture through the filtration membrane to the first tank through the return channel; and
(Ic) switching the channel switch by the controller from the circulation state to the discharge state to discharge the filtrate generated by passing the guided liquid mixture through the filtration membrane to the outside of the liquid treatment apparatus, if a concentration of the photocatalyst particles contained in the first tank falls within a range of not less than a first threshold value and not more than a second threshold value.

2. The method according to claim 1, further comprising:
(Id) treating the liquid mixture by irradiation of the liquid mixture with the light emitted from the light source in the discharge state.

3. The method according to claim 2, wherein
in the step (Id), a polluted liquid is supplied to the first tank.

4. A liquid treatment method using a liquid treatment apparatus, the method comprising:
(IIa) providing the liquid treatment apparatus comprising:
  a first tank having an internal space for storing liquid mixture containing photocatalyst particles;
  a light source for emitting ultraviolet light with which the photocatalyst particles contained in the liquid mixture stored in the internal space of the first tank are irradiated;
  a second tank comprising a filtration membrane therein and having an internal space divided into a first chamber and a second chamber by the filtration membrane, the first chamber being surrounded by the second chamber;
  a communication channel that establishes communication between the internal space of the first tank and the second chamber of the second tank;
  a controller;
  a filtering pump for decompressing the first chamber of the second tank;
  a channel switch;
  an extraction channel that establishes communication between the first chamber of the second tank and the channel switch through the filtering pump;
  a return channel that establishes communication between the channel switch and the internal space of the first tank;
  a discharge channel that establishes communication between the channel switch and an outside of the liquid treatment apparatus,
wherein
  the liquid mixture is guided from the internal space of the first tank to the second chamber of the second tank through the communication channel;
  the guided liquid mixture is passed through the filtration membrane to provide a filtrate in the first chamber of the second tank, the filtrate being generated by passing the guided liquid mixture through the filtration membrane, while the first chamber is decompressed with the filtering pump;
  the filtrate generated by passing the guided liquid mixture through the filtration membrane is sucked into the channel switch through the extraction channel with the filtering pump;
  the channel switch switching by the controller between a circulation state in which the filtrate generated by passing the guided liquid mixture through the filtration membrane is returned to the first tank through the return channel and a discharge state in which the filtrate generated by passing the guided liquid mixture through the filtration membrane is discharged to the outside of the liquid treatment apparatus;
(IIb) circulating the liquid mixture in the liquid treatment apparatus in such a manner that the channel switch is set to be the circulation state so as to return the filtrate generated by passing the guided liquid mixture through the filtration membrane to the first tank through the return channel; and
(IIc) providing a notification of information showing that the circulation state can be switched to the discharge state by the controller, if a concentration of the photocatalyst particles contained in the first tank falls within a range of not less than a first threshold value and not more than a second threshold value.

5. The method according to claim 4, wherein the information further shows a polluted liquid can be supplied to the first tank.

6. A liquid treatment apparatus, comprising:
  a first tank having an internal space for storing liquid mixture containing photocatalyst particles;
  a light source for emitting ultraviolet light with which the photocatalyst particles contained in the liquid mixture stored in the internal space of the first tank are irradiated;
  a second tank comprising a filtration membrane therein and having an internal space divided into a first chamber and a second chamber by the filtration membrane, the first chamber being surrounded by the second chamber;
  a communication channel that establishes communication between the internal space of the first tank and the second chamber of the second tank;
  a filtering pump for decompressing the first chamber of the second tank;
  a channel switch;
  an extraction channel that establishes communication between the first chamber of the second tank and the channel switch through the filtering pump;
  a return channel that establishes communication between the channel switch and the internal space of the first tank; and a discharge channel that establishes communication between the channel switch and an outside of the liquid treatment apparatus, wherein the liquid mixture is guided from the internal space of the first tank to the second chamber of the second tank through the communication channel;

the guided liquid mixture is passed through the filtration membrane to provide a filtrate in the first chamber of the second tank, the filtrate being generated by passing the guided liquid mixture through the filtration membrane, while the first chamber is decompressed with the filtering pump;

the filtrate generated by passing the guided liquid mixture through the filtration membrane is sucked into the channel switch through the extraction channel with the filtering pump;

the channel switch switching between a circulation state in which the filtrate generated by passing the guided liquid mixture through the filtration membrane is returned to the first tank through the return channel and a discharge state in which the filtrate generated by passing the guided liquid mixture through the filtration membrane is discharged to the outside of the liquid treatment apparatus; and the liquid treatment apparatus further comprises a controller which, in operation, circulates the liquid mixture in the liquid treatment apparatus in such a manner that the channel switch is set to be the circulation state so as to return the filtrate generated by passing the guided liquid mixture through the filtration membrane to the first tank through the return channel; and switching the channel switch from the circulation state to the discharge state to discharge the filtrate generated by passing the guided liquid mixture through the filtration membrane to the outside of the liquid treatment apparatus, if a concentration of the photocatalyst particles contained in the first tank falls within a range of not less than a first threshold value and not more than a second threshold value.

7. The liquid treatment apparatus according to claim 6, wherein the controller further, in operation, treats the liquid mixture by irradiation of the liquid mixture with the light emitted from the light source in the discharge state.

8. The liquid treatment apparatus according to claim 7, wherein the controller further, in operation, supplies a polluted liquid to the first tank in the discharge state.

9. A liquid treatment apparatus, comprising:

a first tank having an internal space for storing liquid mixture containing photocatalyst particles;

a light source for emitting ultraviolet light with which the photocatalyst particles contained in the liquid mixture stored in the internal space of the first tank are irradiated;

a second tank comprising a filtration membrane therein and having an internal space divided into a first chamber and a second chamber by the filtration membrane, the first chamber being surrounded by the second chamber;

a communication channel that establishes communication between the internal space of the first tank and the second chamber of the second tank;

a filtering pump for decompressing the first chamber of the second tank;

a channel switch;

an extraction channel that establishes communication between the first chamber of the second tank and the channel switch through the filtering pump;

a return channel that establishes communication between the channel switch and the internal space of the first tank; and a discharge channel that establishes communication between the channel switch and an outside of the liquid treatment apparatus;

wherein the liquid mixture is guided from the internal space of the first tank to the second chamber of the second tank through the communication channel;

the guided liquid mixture is passed through the filtration membrane to provide a filtrate in the first chamber of the second tank, the filtrate being generated by passing the guided liquid mixture through the filtration membrane, while the first chamber is decompressed with the filtering pump;

the filtrate generated by passing the guided liquid mixture through the filtration membrane is sucked into the channel switch through the extraction channel with the filtering pump;

the channel switch switching between a circulation state in which the filtrate generated by passing the guided liquid mixture through the filtration membrane is returned to the first tank through the return channel and a discharge state in which the filtrate generated by passing the guided liquid mixture through the filtration membrane is discharged to the outside of the liquid treatment apparatus;

the liquid treatment apparatus further comprises a controller which, in operation, circulates the liquid mixture in the liquid treatment apparatus in such a manner that the channel switch is set to be the circulation state so as to return the filtrate generated by passing the guided liquid mixture through the filtration membrane to the first tank through the return channel; and provides a notification of information showing that the circulation state can be switched to the discharge state, if a concentration of the photocatalyst particles contained in the first tank falls within a range of not less than a first threshold value and not more than a second threshold value.

10. The liquid treatment apparatus according to claim 9, wherein the information further shows a polluted liquid can be supplied to the first tank.

* * * * *